the first compartment, and a pair of slotted inlet water distribution conduits are disposed in the first compartment, each positioned horizontally within a filter area centrally above a filter bed. The slotted water distribution conduits are connected together and to the inlet water connection. Means for removing separated oil from the first compartment are provided therein and a pair of filtered water outlet connections are provided, each disposed in a filter area below a filter bed. Filtered water inlet and outlet connections are disposed in the bottom portion of the second compartment, and conduit means for conducting filtered water between the first compartment and the second compartment are connected to the first compartment filtered water outlet connections and the second compartment filtered water inlet connection. A backwash pump is connected to the conduit means and valve means are provided in the conduit means for controlling the flow of filtered water from the first compartment to the second compartment, and the flow of backwash water from the second compartment separately to the filter areas of the first compartment.

United States Patent [19]
Barra et al.

[11] 3,784,010
[45] Jan. 8, 1974

[54] APPARATUS FOR SEPARATING OIL AND SOLIDS FROM WATER

[75] Inventors: Frank J. Barra, Midwest City, Okla.; Kenneth R. Murrell, Odessa, Tex.

[73] Assignee: Black, Sivalls & Bryson, Inc., Oklahoma City, Okla.

[22] Filed: Aug. 23, 1972

[21] Appl. No.: 283,180

[52] U.S. Cl.............. 210/114, 210/115, 210/128, 210/264, 210/277
[51] Int. Cl............................................ B01d 23/26
[58] Field of Search ...................................
    210/114–116, 126, 264, 265, 275, 277, 278

[56] References Cited
UNITED STATES PATENTS

| | | | |
|---|---|---|---|
| 2,825,422 | 3/1958 | Schoenfeld | 210/115 X |
| 2,935,195 | 5/1960 | Dunn | 210/264 X |
| 3,433,359 | 3/1969 | Lupdin et al. | 210/265 X |
| 3,558,482 | 1/1971 | Young | 210/265 X |

*Primary Examiner*—John Adee
*Attorney*—C. Clark Dougherty, Jr., Dunlap, Laney, Hessin & Dougherty

[57] ABSTRACT

The present invention relates to improved apparatus for separating oil and solids from a stream of water. A closed vessel is provided having a first vertical partition disposed therein dividing the vessel into first and second compartments. A second vertical partition is disposed within the lower portion of the first compartment dividing it into two separate filter areas and a filter bed is disposed in each of the filter areas. An inlet water connection is provided extending to within

5 Claims, 3 Drawing Figures

PATENTED JAN 8 1974  3,784,010

3,784,010

APPARATUS FOR SEPARATING OIL AND SOLIDS FROM WATER

BACKGROUND OF THE INVENTION

1. Field of the Invention

The present invention relates to improved apparatus for separating oil and solids from water, and more particularly, but not by way of limitation, to improved apparatus for filtering a stream of water containing oil-coated solids so that the oil and solids are removed from the water and the oil is recovered.

2. Description of the Prior Art

Many various types and kinds of water filters have been developed and used successfully for removing solid particles from water and other liquids. A particular water filtering problem encountered in the production of oil wells is the treatment of produced water to remove entrained oil and oil-coated solids therefrom. After separation of produced oil and water in conventional separation apparatus, the water must be disposed of in a suitable manner. Often, this is accomplished by pumping the water into a disposal well, and in order to prevent plugging of the disposal well formation by oil coated solids entrained in the water and the waste of the oil carried with the water, the water must be treated for the removal of the solids and oil prior to injection.

This type of water filtering problem is particularly acute in water flood operations where large volumes of water are pumped into producing formations to increase the oil productivity thereof. The water recovered with the produced oil is separated and recycled to the producing formation, and in order to efficiently recover the oil produced and remove solids from the water so that formation plugging does not occur, the water must be treated prior to injection into the formation.

It has heretofore been the practice to pass a stream of water containing oil and oil-coated solids through a vessel containing a filter bed for removing the solid particles and coalescing the oil from the water. Periodically, the filter bed utilized must be backwashed in order to remove accumulated solids therefrom and restore the filtering effectiveness thereto. So that a relatively small backwash pump may be employed, the filter vessel may include provision for backwashing the filter bed in portions. That is, separate portions of the filter bed may be sequentially backwashed thereby maintaining the velocity of flow required for the effective removal of solid material without the necessity of a very large backwash pump and expense involved in the installation and operation thereof.

By the present invention, improved apparatus for efficiently and economically separating oil and solids from water is provided which includes provision for backwashing the filter bed in portions and which includes a filtered water accumulator and source of backwash water within a unitary vessel.

SUMMARY OF THE INVENTION

The present invention relates to improved apparatus for separating oil and solids from water which comprises a closed vessel having a first vertical partition disposed therein dividing the vessel into first and second compartments. A second vertical partition is disposed within the lower portion of the first compartment thereby dividing the first compartment into two separate filter areas, and a filter bed is disposed in each of the filter areas. An inlet water conduit is provided extending within the first compartment, and a pair of slotted water distribution conduits are disposed in the first compartment, each positioned horizontally within a filter area above a filter bed. The slotted inlet water distribution conduits are connected together and to the inlet water conduit. A pair of filtered water outlet connections are provided, each disposed in a filter area below a filter bed, and filtered water inlet and outlet connections are disposed in the bottom portion of the second compartment. Conduit means for conducting filtered water between the first compartment and the second compartment are connected to the first compartment filtered water outlet connections and the second compartment filtered water inlet connection. A backwash pump is connected to the conduit means and valve means are disposed in the conduit means for controlling the flow of filtered water from the first compartment to the second compartment and the flow of backwash water from the second compartment separately to the filter areas of the first compartment, through the filter beds and out of the first compartment by way of the slotted inlet water distribution conduits.

It is, therefore, an object of the present invention to provide an improved apparatus for efficiently and economically separating oil and solids from water.

A further object of the present invention is to provide an improved apparatus for removing oil and solids from a stream of water wherein the backwash of the filter beds may be carried out simply and economically.

DESCRIPTION OF THE PREFERRED EMBODIMENTS

Figure 1:
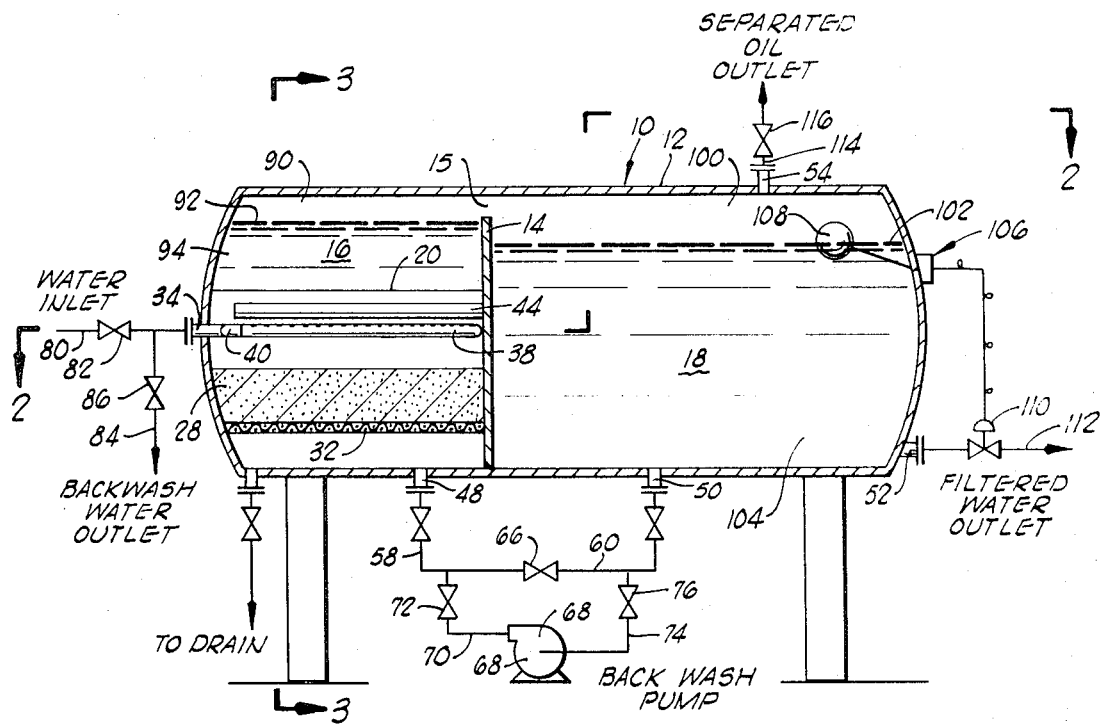
FIG. 1 is a side elevational view of the improved apparatus of the present invention in cross section.

Referring now to the drawings, and particularly to FIG. 1, the improved apparatus of the present invention is illustrated and generally designated by the numeral 10. The apparatus 10 is comprised of a closed horizontal vessel 12 having a vertical partition 14 disposed therein which divides the vessel into a first compartment 16 and a second compartment 18. As shown best in FIG. 3, the vertical partition 14 is seal welded to the inside periphery of the vessel 12 except for the uppermost position thereof which terminates a short distance below the top of the vessel 12. The resulting opening 15 between the partition 14 and the top of the vessel 12 provides a passageway for removing oil from the first compartment 16 as will be further described herein.

Figure 2:
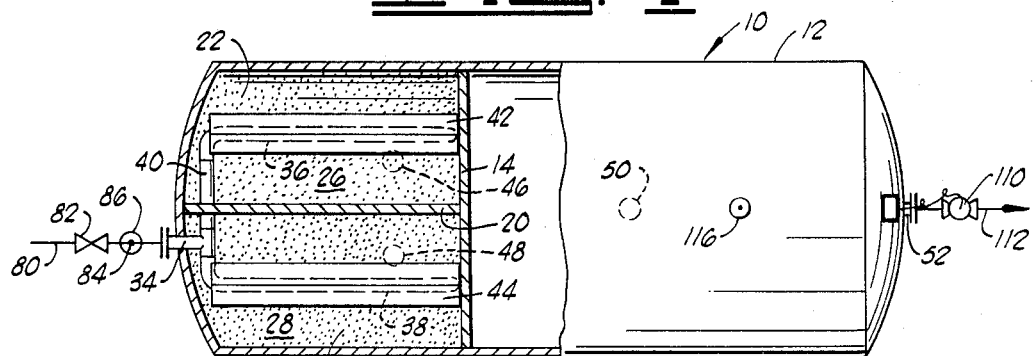
FIG. 2 is a cross sectional view taken along lines 2—2 of FIG. 1.

A second vertical partition 20 is disposed within the first compartment 16 of the vessel 10 positioned on a line coinciding with the axis of the vessel 10. The sides and bottom of the partition 20 are seal welded to the partition 14 and to the end and bottom of the vessel 12. The top edge of the partition 20 is horizontal and terminates a short distance above the axis of the vessel 12 so that a pair of separate filter areas 22 and 24 (FIGS. 2 and 3) are formed in the first compartment 16.

Beds of filter media 26 and 28 are provided in the filter areas 22 and 24 respectively, formed of a suitable filtering material such as sand, ground anthracite coal, etc. As will be understood by those skilled in the art, horizontal perforated gratings or other conventional filter bed supports 30 and 32 are provided in the lower portions of the filter areas 22 and 24 respectively, for supporting the filter beds 26 and 28 within the vessel 12.

An inlet water connection 34 is provided extending into the first compartment 16 of the vessel 12. A pair of slotted water distribution conduits 36 and 38 are disposed within the filter areas 22 and 24 centrally above the filter beds 26 and 28. Each of the water distribution conduits 36 and 38 are connected to a connector pipe 40 which is in turn connected to the inlet water connection 34. The inlet water connection 34, connector pipe 40 and slotted inlet water distribution pipes 36 and 38 are all positioned in a horizontal plane a distance below the top edge of the vertical partition 20. As can be best seen in FIG. 1, the slots formed in the distribution conduits 36 and 38 are positioned on a line and face upwardly. A pair of inverted V-shaped deflector plates 42 and 44 are positioned a short distance above the slotted distribution conduits 36 and 38. As will be described further hereinbelow, the deflector plates 42 and 44 are positioned with respect to the distribution conduits 36 and 38 so that inlet water flowing through the slots of the conduits 36 and 38 is caused to flow upwardly, impinge on the deflectors 42 and 44 and then flow downwardly through the filter beds 26 and 28.

A pair of filtered water outlet connections 46 and 48 are provided in the first compartment 16 of the vessel 12 below the filter beds 26 and 28 respectively. A filtered water inlet connection 50 is provided in the bottom portion of the vessel 12 in the second compartment 18. A filtered water outlet connection 52 for removing filtered water from the second compartment 18 is provided in the lower portion of the vessel 12 and an oil outlet 54 for removing separated oil from the second compartment 18 is provided in the top portion of the vessel 12.

Figure 3:
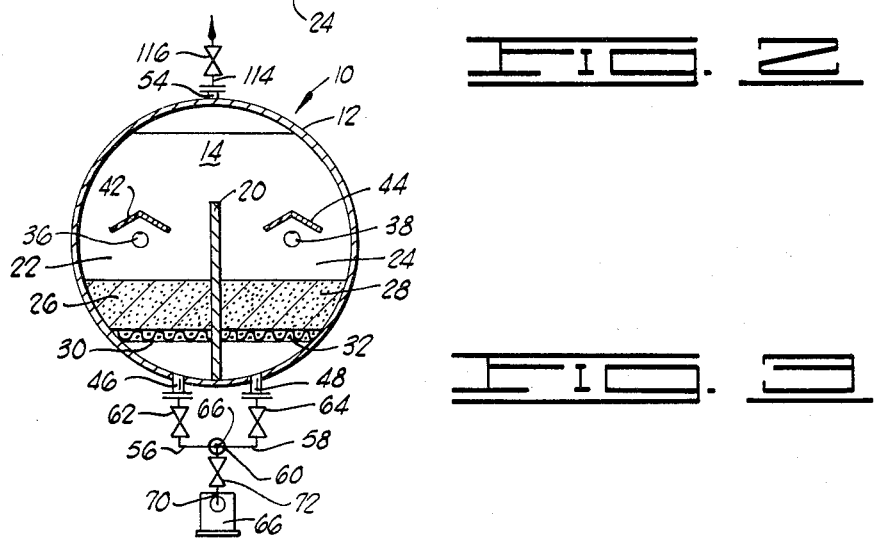
FIG. 3 is a cross sectional view taken along lines 3—3 of FIG. 1.

As best shown in FIGS. 1 and 3, the filtered water outlet connections 46 and 48 are connected by a pair of conduits 56 and 58 to a conduit 60 which is in turn connected to filtered water inlet connection 50. A pair of conventional shutoff valves 62 and 64 are disposed in the conduits 56 and 58 respectively, and a shutoff valve 66 is disposed in the conduit 60. A conventional backwash pump 68 is provided connected to the conduit 60 by conduits 70 and 74 having shutoff valves 72 and 76 disposed therein respectively.

The inlet water connection 34 is connected to the source of water to be treated by a conduit 80. A shutoff valve 82 is disposed in the conduit 80 and a conduit 84 for removing backwash water from the apparatus 10 is connected to the conduit 80 between the valve 82 and the inlet water connection 34. A shutoff valve 86 is provided in the conduit 84.

OPERATION OF THE APPARATUS 10

In operation of the apparatus 10, a stream of water containing entrained oil and oil-coated solid material is flowed by way of conduit 80 and valve 82 to the inlet water connection 34 of the apparatus 10. The valve 86 disposed in the backwash water outlet conduit 84 is closed until such time as the filter beds 26 and 28 are backwashed.

The inlet water passes through the inlet water connection 34 and the connector pipe 40 into the slotted water distribution conduits 36 and 38. As will be understood, the stream of inlet water is divided into two streams which flow through the slots disposed in the conduits 36 and 38 in an upward direction into contact with the deflector plates 42 and 44 respectively. The upwardly flowing water impinges on the inverted V-shaped deflector plates 42 and 44 and the direction of the water is changed so that it flows downwardly towards the filter beds 26 and 28 respectively. Due to the change in direction of the inlet water as it passes from the slotted inlet water distribution conduits 36 and 38 to the filter beds 26 and 28, entrained oil carried in the water agglomerates on the deflector plates 42 and 44 and gravitates upwardly from the deflector plates into a body of oil 90 maintained in the top portion of the compartment 16 of the vessel 12.

The vessel 12 is operated in a flooded manner, i.e., the vessel 12 is completely filled with liquid. Due to the lighter density of oil as compared to water, it gravitates upwardly within the vessel 12 and an oil-water interface is formed. That is, an oil-water interface 92 is formed within the first compartment 16 of the vessel 12 between the body of oil 90 in the upper portion thereof and a body of water 94 in the lower portion thereof. The separated oil accumulating in the first compartment 16 may be removed by providing an oil outlet connection in the top portion of the vessel 12 extending to within the compartment 16. If this arrangement is utilized, the partition 14 extends to the top of the vessel 12 forming a fluid tight seal between the first compartment 16 and the second compartment 18. However, in order to retain the separated oil within the vessel 12 for as long a time period as possible thereby insuring complete separation of the oil from the water, the arrangement illustrated in the drawings and described above whereby a passageway 15 is formed between the top portions of the compartments 16 and 18 is utilized. In operation of this embodiment of the apparatus 10, oil accumulating in the body 90 thereof within the compartment 16 passes through the passageway 15 into the top portion of the compartment 18 forming a body of oil 100 within the compartment 18. An oil-water interface 102 is formed in the compartment 18 between the body of oil 100 and a body of water 104 maintained within the compartment 18.

After being discharged within the filter areas 22 and 23 of the first compartment 16, the inlet water containing entrained oil-coated solids passes downwardly through the filter beds 26 and 28. As the water passes through the filter beds 26 and 28, the solid material settles onto the filter beds and is removed from the water. The clean filtered water passes out of the first compartment 16 of the vessel 12 by way of the outlet connections 46 and 48. The oil coating on the solid material trapped on the filter beds agglomerates into drops and gravitates upwardly into the body of oil 90 in the compartment 16 and the body of oil 100 in the compartment 18. The filtered water from the first compartment 16 passes through the conduits 56 and 58, valves 62 and 64, the conduit 60, and the valve 66 into the compartment 18 by way of the inlet connection 50. A float operated level controller assembly 106 is provided attached to the vessel 12 for automatically controlling the discharge of water and oil from the compartment 18. That is, the liquid level control device 106 senses the level of the oil-water interface 102 by means of an interface float 108. A control valve 110 is disposed in the conduit 112 connected to the water outlet connection 52. The control valve 110 is operably connected to the level control device 106 and is opened and closed automatically in accordance with the level of the interface 102 within the compartment 18. That is, as the interface 102 rises, the valve 110 is opened to allow more water to escape from the body 104 thereof thereby lowering the interface. As the interface 102 lowers, the valve 110 is closed thereby forcing oil from the body 100 thereof out the outlet connection 54 by way of outlet conduit 114. A pressure controlled valve 116 is provided disposed in a conduit 114 attached to the oil outlet connection 54. As will be understood, when the valve 110 is closed the pressure within the vessel 12 increases causing the pressure control valve 116 to open and oil to be discharged from the vessel 12.

Periodically during the operation of the apparatus 10, the filter beds 26 and 28 become loaded with solids removed from the water passing therethrough, which solids must be removed in order to prevent clogging of the filter beds. In the operation of the apparatus 10 to bring about the quick and efficient backwashing of the filter beds 26 and 28, the flow of inlet water is shut off to the apparatus 10 by closing the shutoff valve 82 and the valve 86 is opened. The vessel 12 is then isolated by closing appropriate shutoff valves (not shown). One of the valves 62 and 64 is closed, the valve 66 is closed, and the valves 72 and 76 are opened. The backwash pump 68 is then started so that filtered water is drawn from the compartment 18 of the vessel 12 by way of the conduit 60 and the conduit 74 into the backwash pump 68. The backwash water is discharged from the pump 68 into the compartment 16 of the vessel 12 by way of the conduit 70, the valve 72, one of the conduits 56 or 58 and one of the valves 62 or 64. Assuming that the filter area 22 is backwashed first, the backwash water flows by way of conduit 56, valve 62 and the connection 46 upwardly through the filter bed 26. The backwash water accumulates in the filter area 22 until a level is reached such that the backwash flows into the water distribution conduit 36 by way of the slots contained therein. The backwash water and removed solids then pass from the filter bed 26 by way of the conduit 36 and connection 34 into the conduit 84. As will be understood, the partition 20 which terminates at a level above the conduits 36 and 38 prevents backwash water and solid material from spilling into the filter area 24 while the filter area 22 is being backwashed and vice versa. Once the backwashing of the filter bed 26 is completed, valve 62 is closed and valve 64 is opened so that the filter bed 28 within the filter area 24 is backwashed in an identical manner. Because the filter beds within the compartment 16 may be backwashed in two portions or parts, the backwash pump 68 may be relatively small and inexpensive to operate. Once the backwashing operation has been completed appropriate valves are closed and opened so that normal flow of water and oil through the apparatus 10 is restarted.

Thus, by the present invention an improved apparatus for separating oil and solids from water is provided which is economical to install and operate as compared to prior art apparatus and which is well adapted to carry out the objects and attain the ends and advantages mentioned herein. While presently preferred embodiments of the invention are given for the purpose of disclosure, numerous changes in detail of the construction and arrangement of parts can be made which will readily suggest themselves to those skilled in the art and which are encompassed within the spirit of the invention disclosed herein.

What is claimed is:

1. Apparatus for separating oil and solids from water which comprises:

a closed vessel;

a first vertical partition disposed within said vessel dividing said vessel into first and second compartments;

a second vertical partition disposed within the lower portion of said first compartment dividing said first compartment into two separate filter areas;

a horizontal filter bed disposed in each of said filter areas;

an inlet water conduit connected through a wall of said vessel and extending within said first compartment;

a pair of slotted inlet water distribution conduits each positioned horizontally within one of said filter areas above one of said filter beds, said slotted inlet water distribution conduits being connected together and to said inlet water conduit;

a pair of filtered water outlet connections, each disposed in one of said filter areas below said filter beds;

means for removing separated oil from the top portion of said first compartment and from said vessel;

filtered water inlet and outlet connections disposed in the bottom portion of said second compartment;

conduit means for conducting filtered water between said first compartment filter areas and said second compartment connected to said first compartment filtered water outlet connections and said second compartment filtered water inlet connection;

a backwash water pump connected to said conduit means; and valve means disposed in said conduit means and connected to said inlet water conduit for controlling the flow of filtered water from said first compartment to said second compartment and the flow of backwash water from said second compartment separately to said filter areas of said first compartment, through one of said filter beds and out of said first compartment and said vessel by way of one of said slotted inlet water distribution conduits and said inlet water conduit.

2. The apparatus of claim 1 which is further characterized to include level control means for controlling the level of filtered water in said second compartment attached to said vessel.

3. The apparatus of claim 2 wherein said means for removing the separated oil from the top portion of said first compartment and from said vessel comprises an oil outlet connection disposed in the top portion of said first compartment.

4. The apparatus of claim 2 wherein said means for removing separated oil from the top portion of said first compartment and from said vessel comprises:

an oil overflow passageway comunicating said first and second compartments; and an oil outlet connection disposed in the top portion of said second compartment.

5. The apparatus of claim 3 which is further characterized to include:

each of said slotted inlet water distribution conduits including slots formed on a line along a length thereof and positioned facing upwardly; and a pair of elongated inverted V-shaped deflector plates disposed within said first compartment each positioned parallel to the slots of and above one of said slotted conduits.

* * * * *